United States Patent [19]

Rashev

[11] Patent Number: 5,000,398

[45] Date of Patent: Mar. 19, 1991

[54] FLYING MULTI-PURPOSE AIRCRAFT CARRIER AND METHOD OF V/STOL ASSISTED FLIGHT

[76] Inventor: Michael S. Rashev, 40 W. 72nd St., Apt. 31B, New York, N.Y. 10023

[21] Appl. No.: 427,443

[22] Filed: Oct. 27, 1989

Related U.S. Application Data

[63] Continuation-in-part of Ser. No. 261,988, Oct. 25, 1988, abandoned, which is a continuation-in-part of Ser. No. 68,404, Jul. 1, 1987, abandoned.

[51] Int. Cl.$^5$ .................. B64C 27/22; B64C 37/02
[52] U.S. Cl. ............................................ 244/2; 244/25; 244/116; 244/110 E
[58] Field of Search .............. 244/2, 25, 60, 114, 244/115, 116, 63, 110 C, 110 E, 110 F

[56] References Cited

U.S. PATENT DOCUMENTS

| Re. 16,164 | 9/1925 | Hall | 244/2 |
|---|---|---|---|
| 1,801,039 | 4/1931 | Florig et al. | 244/2 |
| 1,833,033 | 11/1931 | Ortege | 244/25 |
| 2,843,337 | 7/1958 | Bennett | 244/2 |
| 3,003,717 | 10/1961 | Booker | 244/2 |
| 3,006,576 | 10/1961 | Elijah | 244/2 |
| 3,291,242 | 12/1966 | Tinajero | 244/2 |
| 3,298,633 | 1/1967 | Dustol et al. | 244/2 |
| 3,568,953 | 3/1971 | Beezley | 244/2 |
| 3,817,479 | 6/1974 | Crowley | 244/2 |
| 4,462,560 | 7/1984 | Earl | 244/2 |

FOREIGN PATENT DOCUMENTS

| 702936 | 2/1965 | Canada | 244/2 |
|---|---|---|---|
| 926613 | 5/1966 | United Kingdom | 244/2 |

Primary Examiner—Galen Barefoot

[57] ABSTRACT

The Flying Multi-Purpose Aircraft Carrier (FMPAC) comprises a runway body which is provided with V/STOL capability by at least two rotary wings, located outside the two lateral ends of the runway body in a side-by-side configuration. The rotary wings are, preferably, of a large diameter helicopter rotor blade type, and are powered by respective shaft turbine engines. A substantially flat runway platform is provided along the middle portion of the runway body, between the left and right helicopter rotary wings. The runway platform is located as low as possible, in order to secure flight stability of the composite aircraft. The top surface of the runway platform has a substantially flat and rectangular-like shape defining a conventional runway, and may allow a fixed wing CA to take-off from or to land on it, during flight of the FMPAC, allowing the pilot of the CA to operate his aircraft with a considerable margin of error. During composite flight, the brakes of the CA's landing gear should be actuated and in addition, its landing gear should be locked down to the surface of the FMPAC. Any CA may be assisted for V/STOL by means of a FMPAC, provided that its weight is not larger than the payload capability of the FMPAC. The V/STOL assisted flight of CA may be performed from any relatively flat ground surface, or alternatively, it may be performed from a water surface, if the FMPAC is equipped with a flying boat undercarriage.

20 Claims, 13 Drawing Sheets

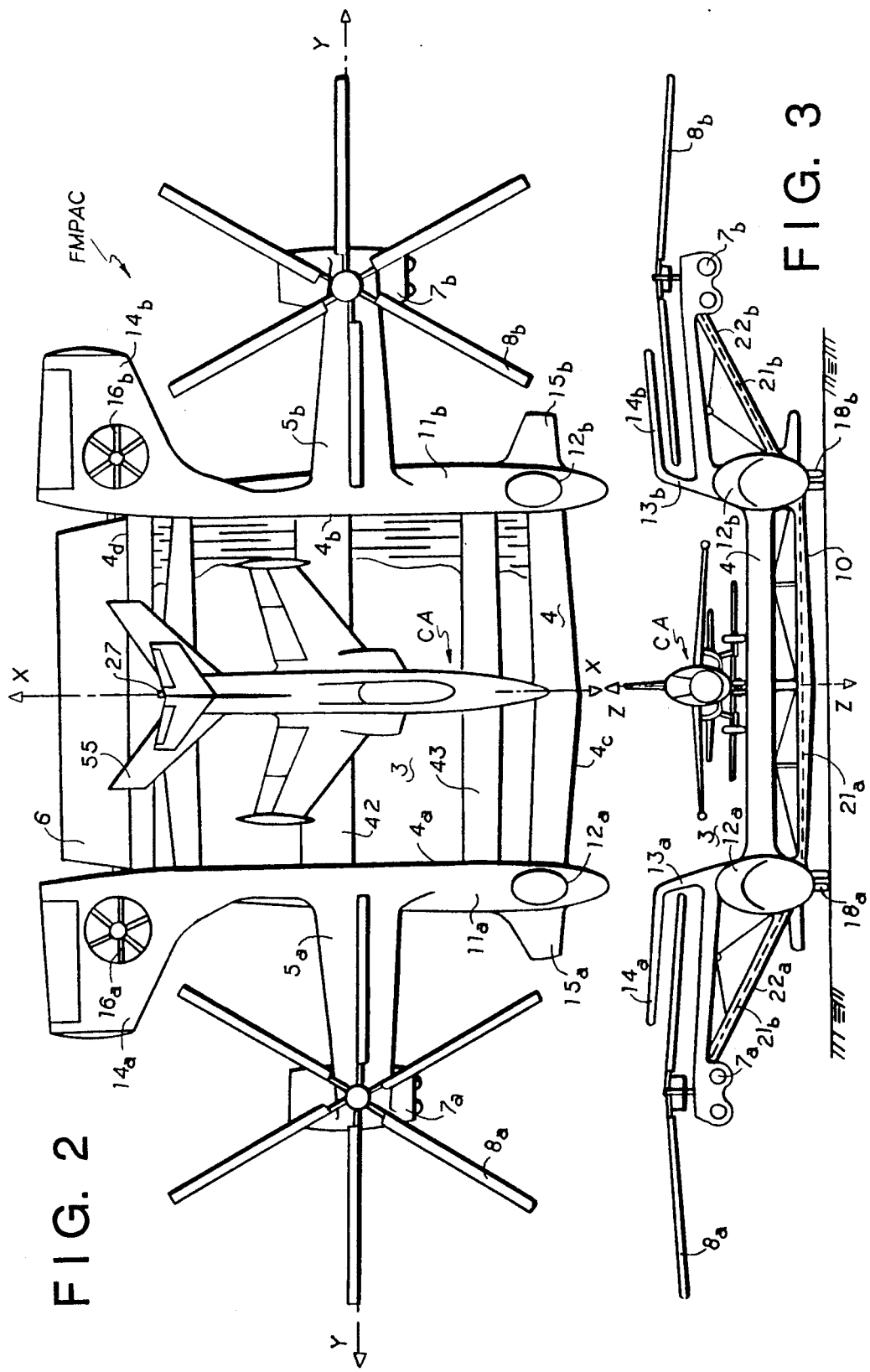

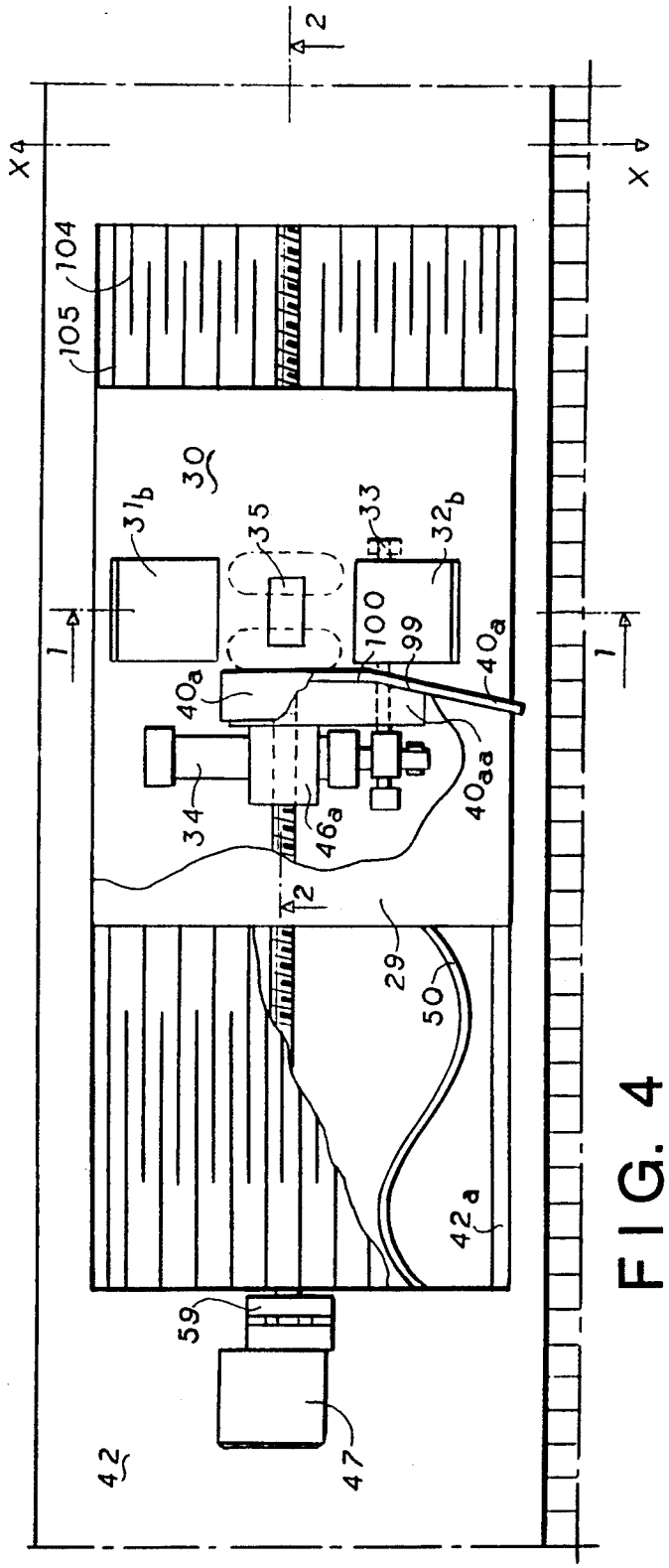

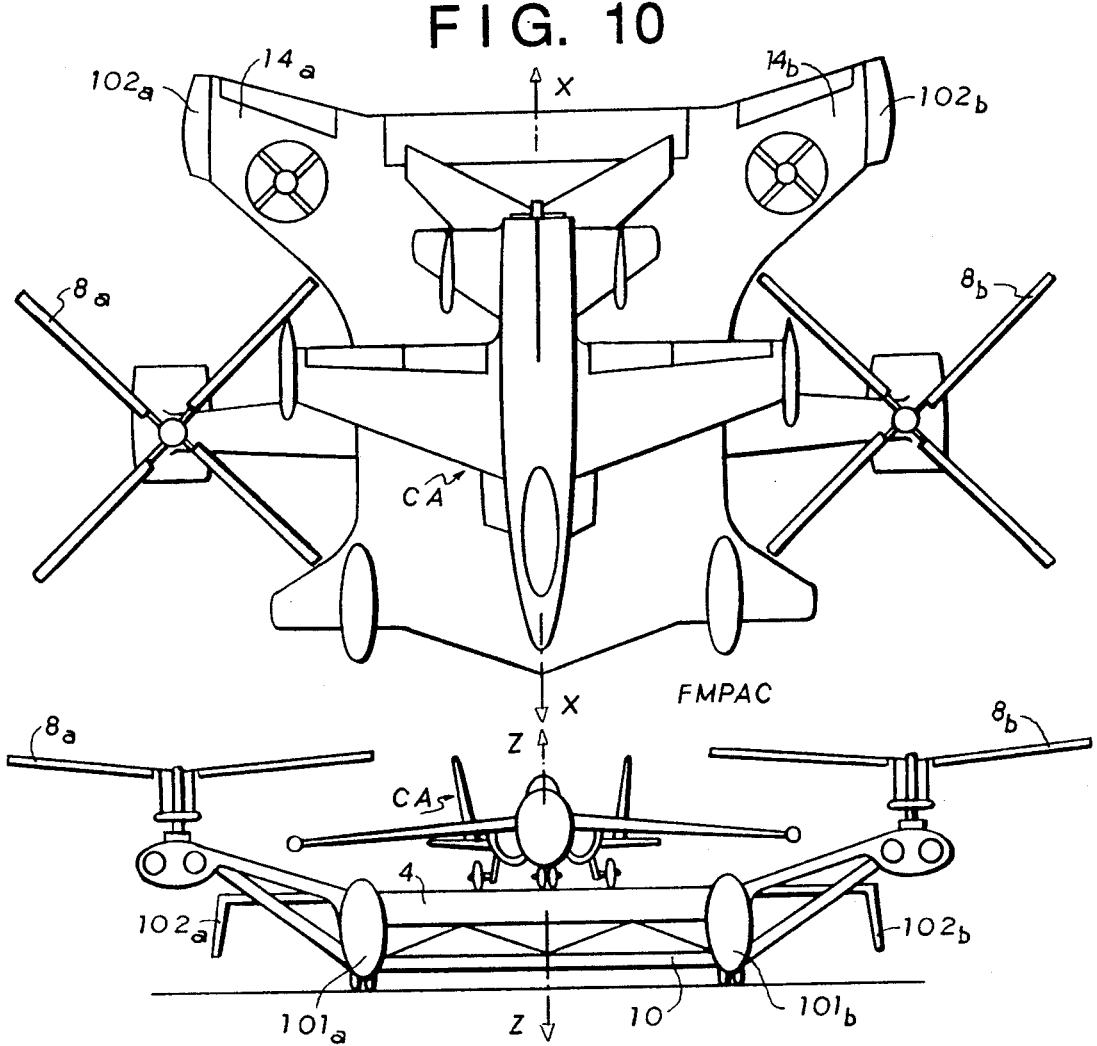
FIG. 10
FIG. 11
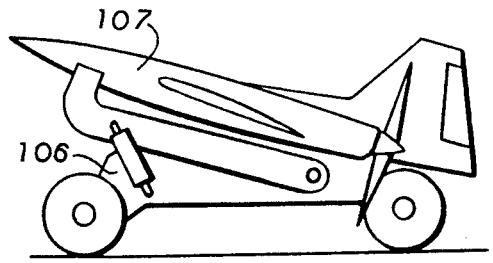
FIG. 12

FLYING MULTI-PURPOSE AIRCRAFT CARRIER AND METHOD OF V/STOL ASSISTED FLIGHT

REFERENCE TO RELATED APPLICATION

This is a continuation-in-part of my application serial No. 07/261.988 filed Oct. 25, 1988 and allowed by Notice of Allowance dated Aug. 2, 1989, now abdandoned, which is in turn a continuation-in-part of my application Ser. No. 07/068,404 filed Jul. 1, 1987, now abandoned. I hereby incorporate by reference herein the entire content of said applications and claim priority, based on the filing date of each for all common subject matter.

BACKGROUND OF THE INVENTION (a) Field of the Invention

The present invention relates to the field of composite aircraft and more particualrly to a Flying Multi-Purpose Aircraft Carrier (FMPAC) and method of V/STOL assisted flight of fixed wing Conventional Aircraft (CA).

(b) State of the Art

Runway dependency is causing everyday problems experienced by fixed wing CA. Thus, one of the present day tendencies in aeronautics is to provide an aircraft with V/STOL (Vertical/Short Take-OFF and Landing) capability. Such approach, however, leads to costly and less reliable aircraft configurations, having reduced maximal speed and/or payload, such as the V-22 Ospray aircraft. Various concepts of composite aircraft have been proposed to resolve the above design conflict. Configurations with low reliability, low maintainability, high production costs and low efficiency in low operation, and/or a necessity to substantially modify the CA before using it for V/STOL assisted composite flight have resulted in abandoning of numerous ideas disclosed in the prior art. Frederick et al, for example, in a British patent No. 926,613 issued on May 22, 1963, and Griffith in U.S. Pat. No. 3.070.326 issued on Dec. 25, 1962 teach a composite aircraft comprisng jet engines for a V/STOL operation. Jet engines occupy a relatively small space, but extremely large number of engines are necessary to be employed (for example, Griffiths suggests 32 engines), according to a preliminary analysis, showing that the total weight of a composite aircraft with a CA on board would be at least two times that of the lifted CA. Also, a vertical position of the gas turbine engines, which have inherent considerable length, will increase the height of the platform which will respectively increase the flight instability of the composite aircraft, especially when a CA is positioned on the top of such a platform. Further, all engines should be tiltable or a new set of horizontal engines should be employed to provide a horizontal thrust. Obviously, flight control, maintainability and reliability of a structure with such a large number of engines, introduced as a result of their inherent low impulse in static condition of work, would be poor. Further disadvantage of the Frederick's platform is that the CA, when attached to such aircraft carrier, should be positioned directly above its engines. This necessitates the provision of ductwork for the jet intakes which is both expensive and may interfere with the stability of the carried CA during separation or coupling.

Booker, also describes a composite aircraft, in a U.S. Pat. No. 3,003,717 issued on Jul. 22, 1960, wherein a large sized CA serves as a landing platform for rescuing a disabled aircraft. The disclosed aircraft has problems associated with the lack of V/STOL operation. To resolve this problem, Bennett in U.S. Pat. No. 2,843,337, issued on Jul. 15, 1958 proposes a V/STOL composite aircraft using a large helicopter blade rotor to lift a CA. Such an arrangement is, however, not efficient, from another standpoint. It reduces the lift and the stability of the CA as a result of the downwash, produced by the large diameter helicopter rotor, acting on the fixed wing aircraft before and after separation. Other patents also describe various ideas to resolve the problem associated with V/STOL of a CA. None of them, however, makes a practical sense, again, due to low reliability, low maintainability, and low efficency in operation.

Furthermore, none of the disclosed ideas in the patent literature shows a composite aircraft allowing landing of CA with a substantial margin of error. None of the prior art teaches composite aircraft for V/STOL operation comprising minimal number of gas turbine engines, so as to provide low cost manufacturing and operation of the aircraft. None of the prior art shows an aircraft with inherent stability during forward and vertical flight. None of the prior art describes a multi-purpose composite aircraft, which can be used as a "work horse" type of flying transportation vehicle, for example, to include a detachable land moving carriage, whose wheels may be locked down to the surface of the runaway platform, instead of a CA, and to carry various payloads. Such a detachable carriage, for example, may be used to carry a large volume of fire extinguishing liquids, to transport various payloads including passengers, to carry various observation or communication instruments, to transport, for example, a launcher comprising a remote piloted vehicle on-board or other flying objects, needed to be transported to the place of launching or launched during flight, and, for example, during hovering of the V/STOL composite aircraft.

SUMMARY OF THE INVENTION

A primary object of the present invention is to provide a V/STOL aircraft carrier, enabling fixed wing CA to take off and land on most of the ground or water surfaces without requiring conventional runway or conventional aircraft carrier, thus to unload major airports from the burden of the small, and, perhaps, larger sized CA.

Another object of the present invention is to provide landing of the CA on the surface of the V/STOL aircraft carrier, with a large margin of error, which is easier and more convenient to perform, than to land on conventional runway, as a result of transferring the execution of the last and most difficult part of a normal flight to the pilot of the V/STOL aircraft carrier.

A further object of the present invention is to provide a reliable and safe V/STOL aircraft carrier and reliable and safe operation of the composite aircraft during V/STOL assisted flight.

Still further object of the present invention is to enable CA to perform such an assisted V/STOL operation with substantially minimal design modifications.

Other object of the present invention is to increase the operational range or flight distance of CA, as a result of using the advantage of V/STOL assisted flight, and also to reduce the duration of flight between airports.

Another object of the present invention is to provide a V/STOL aircraft carrier, enabling safe emergency landing of a disabled aircraft.

Still another object of the present invention is to provide a V/STOL aircraft carrier for non-operational aircraft or for any type of detachable payload, including a wheeled land vehicle, whose weight and size are not larger than the payload and the size capability of the V/STOL aircraft carrier.

Still further object of the present invention is to increase the maximal payload and to reduce the manufacturing cost of CA, in case it is provided to take-off and land with the assistance of the V/STOL aircraft carrier only.

The defined above objects of the V/STOL aircraft carrier may be further extended; and are accomplished by a Flying Multi-Purpose Aircraft Carrier (FMPAC) according to the present invention.

The FMPAC comprises a runway body which is provided with V/STOL capability by at least two rotary wings, located outside the two lateral ends of the runway body in side-by-side configuration. The rotary wings are, preferably, of a large diameter helicopter rotor blade type, (so as to provide high specific impulse and large static thrust necessary to lift heavy structure, such as a composite aircraft); and are powered by respective shaft turbine engines. A substantially flat runway platform is provided along the middle portion of the runway body, between the left and right helicopter rotary wings. The runway platform is located as low as possible, in order to secure flight stability of the composite aircraft. The top surface of the runway platform has a substantially flat and rectangular-like shape defining a conventional runway, and, therefore, it may allow a fixed wing CA to take-off from or to land on it, during flight of the FMPAC, allowing the pilot of the CA to operate his aircraft with a considerable margin of error. During composite flight, the brakes of the CA's landing gear are actuated and in addition, its landing gear is locked down to the surface of the FMPAC. Any CA may be assisted for V/STOL by means of a FMPAC, provided that its weight is not larger than the payload capabiltiy of the FMPAC.

The V/STOL assisted flight of CA may be performed from any relatively flat ground surface, or alternatively, it may be performed from a water surface, if the FMPAC is equipped with a flying boat undercarriage.

Another object of the present invention is to provide a method of V/STOL of a CA by use of the inventive principles disclosed briefly above and described in detail below. Other objects and aspects of the invention will become apparent from the detailed description of a specific exemplary embodiments of the principle of this invention.

BRIEF DESCRIPTION OF THE DRAWINGS

The above described and other objects and advantages of the invention are hereafter described in greater detail and claimed, reference being had to the accompanying drawings forming a part hereof, wherein like numerals refer to like parts throughout, and in which:

FIG. 2 is a top view of the FMPAC with a CA on board;

FIG. 3 is a front view of the FMPAC comprising a CA on board;

FIG. 4 is a top view of a downlock unit, allowing the landing gear of the CA to be locked down to the FMPAC;

FIG. 5 is a cross-section of FIG. 4 along line 1—1;

FIG. 6 is a cross-section of FIG. 4 along line 2—2;

FIG. 10 is a top view of a modified FMPAC with a CA on board;

FIG. 11 is a front view of the composite aircraft shown in FIG. 10;

FIG. 12 illustrates a side view of a land moving wheeled carriage means illustrating a detachable payload;

DETAILED DESCRIPTION

Figure 1:
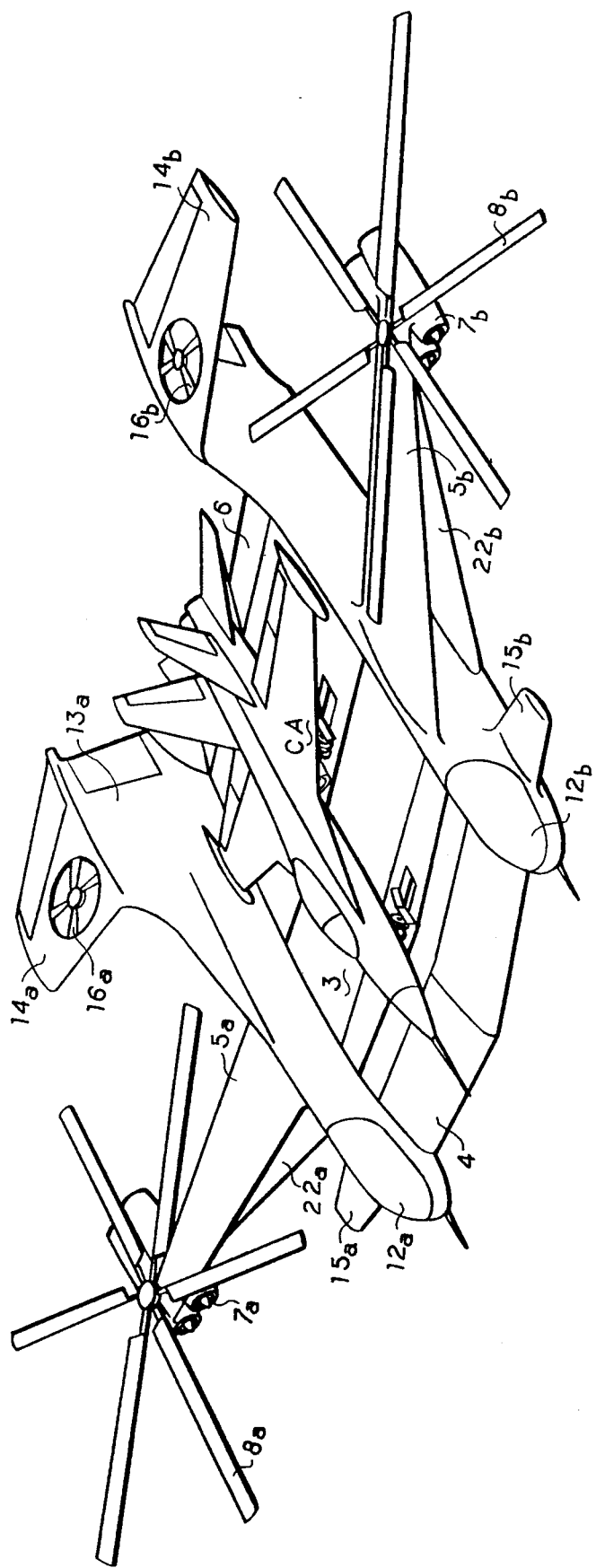
FIG. 1 is a pictorial view of a FMPAC comprising a CA on board.

Referring now to FIG. 1-9, a composite aircraft and method of rotary wing assisted V/STOL of Conventional Aircraft (CA) is described. The composite aircraft consists of a Flying Multi-Purpose Aircraft Carrier (FMPAC), according to the present invention, and of a fixed wing CA locked down to the top surface of the FMPAC.

The FMPAC comprises a runway body 3 and a pair of left and right lift means, such as rotary wings $8a$ and $8b$, mounted for rotation at the ends of two respective side supporting members $5a$ and $5b$ of the runway body 3, in side-by-side configuration. The runway body 3 is substantially symmetrical along its axis X—X which is also the FMPAC's longitudinal axis of symmetry, parallel to the direction of flight. An axis Y—Y passes through the centers of rotation of the two rotary wings $8a$ and $8b$. The axis Y—Y is the FMPAC's lateral axis which is perpendicular to the longitudinal axis X—X, and also perpendiculay to the direction of flight. The central portion of the runway body 3 defines a runway platform 4 between the left rotary wing $8a$ and the right wing $8b$, and has a substantial wide, long and rectangular-like shape. The runway platform platform 4 has two side outboard edges $4a$ and $4b$, both preferably parallel to axis X—X, a front or leading edge $4c$ and a rear or trailing edge $4d$, as shown in FIG. 2. The platform 4 is considerably flat, and its wing-like structure has, preferably, an airfoil crosssection which may be of either symmetrical type or asymmetrical type, in which case it generates life during forward flight. Further, the runway platform 4 is located at the lowest portion of the FMPAC, in order to lower the position of the c.g. of the composite aircraft. The runway body 3 also comprises the two side supporting members 5a and 5b, each of them adjacent to the respective outboard edges 4a and 4b of the runway platform 4. The side supporting members 5a and 5b which support the rotary wings 8a and 8b, may hve a wing-like configuration with a substantially low wing area (to reduce the downwash drag resulting from rotation of the rotary wing 8), or, alternatively, they may have an open frame structure, to provide the two lateral members of the runway body 3 with further reduced downwash drag.

The runway body 3, also, comprises a reinforcing wing-like beam 10, placed under and apart of the main platform 4, along the lateral axis Y—Y. The reinforcing beam 10 may be further extended laterally by two respective structural members 22a and 22b, running along and under the side supporting members 5a and 5b, so as to increase the lateral strength and rigidity of the runway body 3, during take-off from and landing of the CA to the platform 4; and also during the first and the last phases of V/STOL flight of the composite aircraft.

Two vertical stabilizers 13a and 13b are placed at the rear portion of the respective outboard edges 4a and 4b of the runway platform 4. The FMPAC also contains two horizontal stabilizers 14a and 14b, preferably, attached to the top portion of their respective vertical stabilizers 13a and 13b, away from the axis X—X, as shown in FIGS. 1, 2 and 3. At least a portion of the horizontal stabilizers 14a and 14b may rotate about an axis parallel to the axis Y—Y, to provide pitch control momentum about the lateral axis Y—Y during forward flight.

There is also a fuselage 11a, introduced, for example, at least along the front portion of the outboard edges 4a to enclose a flight deck 12a and to, preferably, include the vertical stabilizer 13a. Such an arrangement may be, also, introduced at the other outboard edge 4b of the runway platform 4, and consists of a fuselage 11b to enclose a second flight deck 12b and to support the vertical stablilizer 13b.

The outward ends of the two side supporting members 5a and 5b are the places where shaft turbine engines 7a and 7b are mounted, preferably, under the respective rotary wings 8a and 8b to directly power them. The rotary wings are, preferably, of a helicopter blade type. They are controlled for vetical and horizontal flight or maneuvering, for example, by a swash plate apparatus, not shown in the drawings for simplicity. The swash plate apparatus provides control of the ciclic and collective pitches of the rotary blade 8a and 8b during rotation. The above control, is provided, during vertical and horizontal flight, for example, from the flight deck 12 by the pilot of the FMPAC or, alternatively, it may be excuted by a remote control either from the ground or by the pilot of the CA. The number of blades in each rotor 8 can be two, three, four or more. In the present embodiment the rotor is constructed with eight blades, due to a heavy rotor disc loading of the rotors 8a and 8b. For simplicity, however, each rotor 8 is illustrated in the drawings with six blades. The two wing rotors 8a and 8b rotate in opposite directions, to compensate for the reaction torque resulting during rotation of each rotor 8.

Figure 9:
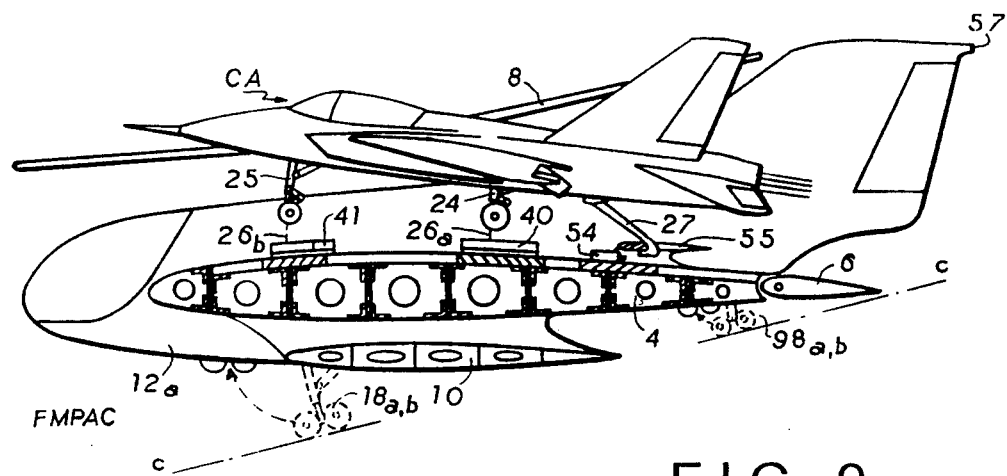
FIG. 9 is an illustration of a CA landing on the surface of the FMPAC-second part of a landing.

The FMPAC comprises a front landing gear 18a and 18b, and a rear landing gear 98a and 98b which are, preferbly, of a retractable type and, also, comprise variable length and capability for a variable angular position, to be used for boarding of the CA or of various wheeled payloads. The landing gear is located, for example, at the bottom portions of fuselages 11a and 11b, as illustrated in FIG. 9. Alternatively, the FMPAC may be provided with a flying boat undercarriage 19a and 19b, partially shown in FIG. 3 and in more detail in FIG. 13.

The main structure of the runway body 4 is made up of spars and stringers running along the axis Y—Y and of ribs, for example, extending along the longitudinal axis X—X of the FMPAC. The structural components are, preferably, enclosed by bottom and top skin coverings.

The rear portion of the runway platform 4 ends with a flap 6 which is adjacent to the trailing edge 4d. The flap 6 may rotate about an axis parallel to the axis Y—Y, in ordr to provide a pitch control momentum during forward flight. Additional pitch control momentum of the FMPAC may be, also, provided by a pair of canary wings 15 which may be partly stationary or may rotate either about axis parallel to the axis Y—Y. The canary wings 15a and 15b are affixed to the outside front portions of the fuselages 11a and 11b, as shown in FIGS. 1, 2 and 3.

A power transmitting shaft assembly 21 is extended between the two blade rotors 8a and 8b, to transmit power, therebetween, for example, during emergency flight. The power shaft assembly 21 consists of a power shaft 21a, extended, for example, along the wing-like reinforcing beam 10 and of two power shafts 21b extending along the two respective structural members 22a and 22b. The structural members 22 also reduce the stess of the side supporting members 5, and extend between the outward ends of the respective side supporting members 5a and 5b and the respective ends of the beam 10, as shown in FIG. 3. Optional branches of the power shaft assembly (not shown in the drawings for simplicity) may extend inside the platform 4 toward its rear end in order to power two optional auxiliary propellers 16a and 16b having variable pitch blades and rotating, preferably, in a horizontal plain. The auxiliary propellers 16a and 16b are located, preferably, in the outlines of the respective horizontal stabilizers 14a and 14b in a side-by-side configuration to provide longitudinal stability of the composite aircraft during low horizontal speed or vertical flight, when, for example, the c.g. of the composite aircraft is not located in its allowable limits. The auxiliary propellers 16a and 16b, however, may be substituted by two main rotors, substantially similar to those of the two main rotors 8a and 8b, in order to provide additional lift when disposed in a side-by-side configuration. Alternatively, one or more than one of the rotors 16 may be located at the rear end of the platform 4.

An autostabilizing system including, for example, a gyroscope apparatus, is introduced (the system is not shown, for simplicity) to achieve, in combination, control of the horizontal stabilizers 14a and 14b, the flap 6, the canary wings 15a and 15b and variation of the thurst of the auxiliary rotors 16, for example, by changing their pitch. Such an autostabilizing system will maintain a normal flight of the composite aircraft during any type of flight disturbances, including during flight in a turbulent atmosphere which creates, for example, vertical windshear, during take-off and landing of the CA, or during variation of the center of gravity of the composite aircraft. In addition, the control of the autostabilizing system may be duplicated by a manual flight control system (also not shown in the drawings for simplicity).

In such a design configuration FMPAC is capable to accommodate Ca of any type, whose wing span is smaller than the width of the runway platform 4, and whose weight is lower or equal to the maximal payload of the FMPAC.

Figure 7:
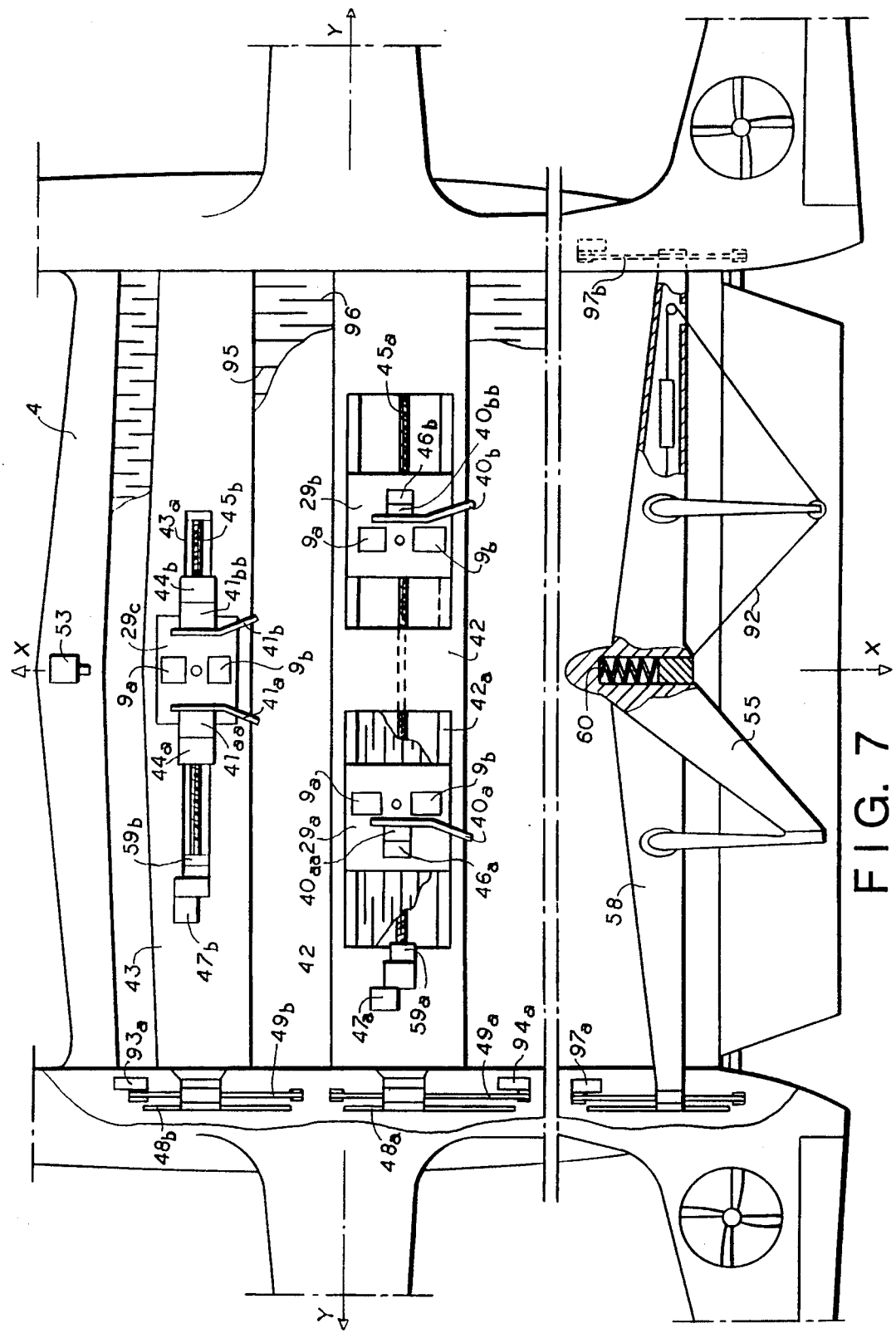
FIG. 7 is an enlarged top view of the central portion of the FMPAC.
Figure 8:
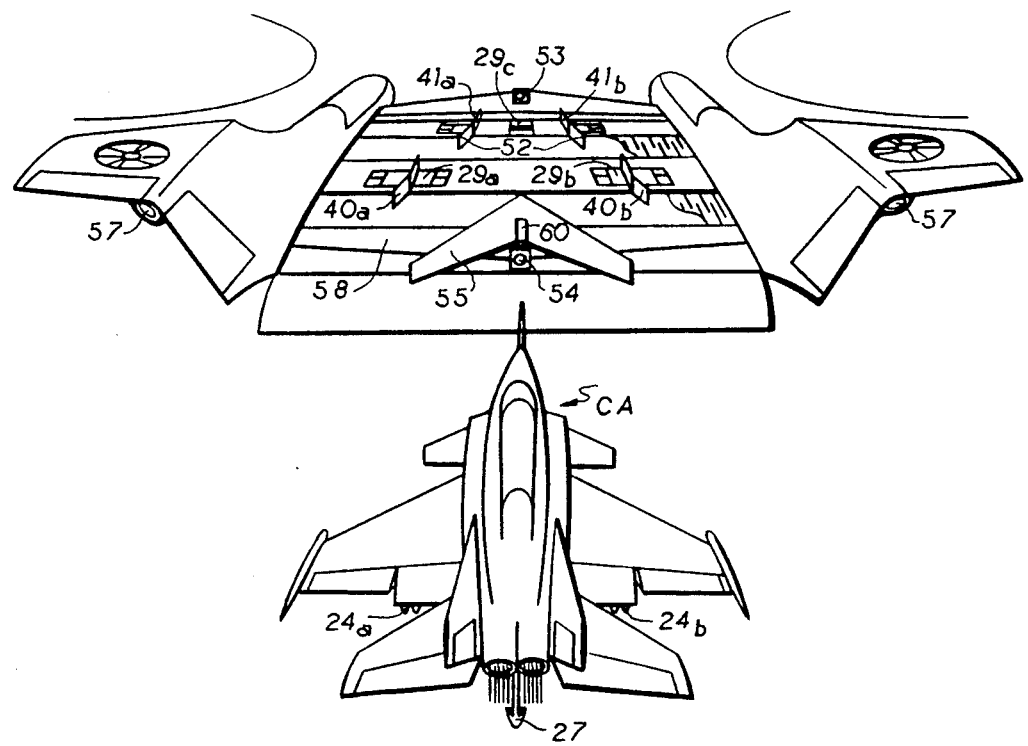
FIG. 8 is an illustration of a CA landing on the surface of the FMPAC-first part of a landing.

The CA is detachably locked down to the surface of the runway platform 4 by means of its rear landing gear 24a and 24b and its front landing gear 25, best illustrated in FIGS. 8 and 9. Two rear module downlock units 29a and 29b and a front module downlock unit 29c, as illustrated in FIGS. 4, 5, 6 and 7, are provided to lock down the landing gear 24a and 24b, and the front landing gear 25 respectively. Each module downlock unit comprises a pair of front and rear downlock mechanisms 9a and 9b, so as to lock down by pressing downward each wheel at its front and rear portions, as explained further below.

The rear downlock units 29a, 29b and the front downlock unit 29c may have variable locations on the surface of the runway platform 4. They may be either bolted down at various locations, in a simple version, or repositioned by employing various types of, for example, X—X and Y—Y shifting carrier means, in order to service various types of CA each having individual landing gear span and individual location of its center of gravity. X—X and Y—Y shifting along the respective axes X—X and Y—Y is accomplished by a front carrier spar 43 and a by a rear carrier spar 42, so as to carry and position the module downlock units 29a, 29b and 29c in various X—X and Y—Y locations on the surface of the runway platform 4. The front spar 43 may have two lockdown module units and the rear spar one module unit, respectively, so as accommodate a landing gear having two front main landing gears and a single rear landing gear, for CA having a classic type of landing gear configuration. In a modern version of landing gear geometry, however, the front spar 43 contains a single module unit 29c located, preferably, at its middle portion, so as to always remain positioned along the longitudinal axis X—X. Accordingly, the rear spar 42 will have two rear downlock module units 29a and 29b, as shown in FIG. 7., to lockdown the main gear of a Ca.

Downlock module units 29a and 29b are, for example, engaged to slide along the axis Y—Y or along the spar 42 by means of respective guiding edges 42a, and are actuated, for example, by an endless chain mechanism or a lead screw type of driving mechanism, to reposition the module units 29 along the later axis Y—Y of the composite aircraft. In the present embodiment, the rear downlock module units 29a and 29b has respective driving nuts 46a and 46b, each engaged to a rear common lead screw 45b, as seen in FIGS. 4, 5, 6 and 7. The lead screw 45a has left and right hand side thread portions in order to provide, during rotation, a variable distance between the two downlock module units 29a and 29b. The rear lead screw 45a is driven, for example, by a gearhead motor 47a, and is protected against overload by a slip clutch 59a.

The X—X respositioning of the rear downlock units 29a and 29b and the front downlock unit 29c is provided, for example, by a rear and a front endless chains 49a and 49b, respectively, which move the rear spar 42 and the front spar 43 along the axis X—X. The respositioning is caused by gearhead motors 94a and 93a, which move the respective spars 42 and 43 along the respective guides 48a and 48b. Similar endless chain driving gearhead motors 94b and 93b may be located at the right side of the main spar 42 and the front spar 43, respectively, to provide a uniform and parallel motion of the spars along the longitudinal axis X—X. The right side driving mechanism of the spars 42 and 43 are not shown in FIG. 7, for simplicity.

The front downlock module unit 29c is located at the middle portion of a front spar 43 to, preferably, remain located along the axis X—X, when the FMPAC is used for V/STOL of a CA having a nose gear.

The rear module downlock units 29a and 29b have also guiding plates 40a and 40b, or alternatively, side pushers 40aa and 40bb having a guiding portion 99 and a pushing portion 100, thereon, both attached to the respective driving nuts 46a and 46b of the respective units 29a and 29b. The position of the guiding plates 40a and 40b, or the position of the alternative side pushers 40aa and 40bb may be adjusted by bolting it down to the respective downlock unit, or by a respective adjusting mechanism, for example, of a lead screw type (not shown), so as to create an adequate distance between a guiding plate or a pusher and the respective downlock mechanism 9a and 9b. After adjustment the guiding plates 40a and 40b move together with the respective downlock mechanism 9a and 9b (enclosed in each downlock module unit 29), thereby, providing a vertical and/or horizontal guidance to the wheels of the main landing gear 24a and 24b of a CA during the last phase of landing, as shown in FIGS. 4, 6, 7, 8 and 9.

Front landing gear guiding plates 41a and 41b or, alternatively, side pushers 41aa and 41bb, having a guiding wall and a pushing wall, thereon, similar to the respective walls 99 and 100 of the side pushers 40aa and 40bb, are also provided to guide the front landing gear 25, or to push it sideway, so as to correct a pilot error in case the front wheel is positioned off center, during the last phase of landing and before downlock; and are attached to respective nuts 44a and 44b, as shown in FIG. 7. The nuts 44a and 44b are, therfore, engaged to a front lead screw 45b having left and right hand side thread portions, to provide variable distance between the two plates 41a and 41b, or between the two side pushers 41aa and 41bb. The front lead screw 45b is actuated by a similar gearhead motor 47b, which is protected against overload by a slip clutch 59b. The above driving mechanisms are, preferably, provided with a positioning feedback means, (not shown) in order to sense the position and the state of each downlock unit.

Alternatively, the front spar 43 may carry two downlock module units 29, which in combination with the two module downlock units 29a and 29b of the rear spar 42 may meet the requirements of locking down a Ca having either the contemporary or the classic landing gear configuration. In the former case, one of the front module units 29 will be centered in the middle portion of the front spar 43, while the other module unit 29 will be shifted off center and used only to lock down a CA with a classic version of its landing gear. In such a case, the rear spar 42 may use only one of its downlock module units 29a or 29b, so as lock the tail wheel of a classic type landing gear.

FIGS. 4, 5 and 6 illustrate in more detail a module unit 29, which contains a pair of the front and the rear downlock mechanisms 9a and 9b, to lock down the respective wheels of the landing gear of a CA. The module unit 29 comprises a housing 30, which accommodate the downlock mechanisms 9a and 9b, both of a plate-bar type. In FIGS. 5 and 6, the wheel of a landing gear, for example, the landing gear 24a, is shown in a locked position, wherein the wheel is locked down to the platform 4 by pressing substantially downward its front upper portion by a front downward plate 31 which is a part of the front downlock mechanism 9a, and by pressing substantially downward its upper rear portion by a rear downlock plate 32, which is a part of the rear downlock mechanism 9b.

The front downlock mechanism 9a will be described only, since the pair of the two plate-bar downlock mechanisms 9a and 9b have similar configuration and operation. The plate 31 has a "downlocked" position 31a, and an "unlcoked" position 31b, as seen in FIGS. 4, 5 and 6, enclosed within a downlock housing 30. The operation of the downlock module units 9a and 9b is caused by actuating means which is, for example, an actuating cylinder 34.

In the illustrated "downlocked" position 31a, the plate 31 is secured against opening by a latch 37, whose position is sensed by a latch sensor 39, as seen in FIG. 5. The latch 37 rotates about a latch shaft 36 and its "locked" and "unlocked" positions are caused, for example, by a latch actuating cylinder 38. The rear downlock plate-bar mechanism 9b is controlled by an identical actuating cylinder and an identical latch mechanism, not shown in FIG. 5, for simplicity. The actuating cylinder 34 may be of a ball screw type linear actuator or it may be a hydraulic actuator included in a hydraulic system, which is, preferably, independent for each downlock unit 29. Each hydraulic system is, for example, entirely enclosed in a respective housing 30 and it comprises additional hydraulic components, such as a gear pump, a hydraulic accumulator, a two positioning selector valve and hydraulic filters, all adequately connected in a hydraulic system, not shown in the drawings, for simplicity. The two positioning selector valve is, preferably, actuated by a solenoid. Its "downlocked" and "unlocked" positions are controlled by a two-positioning microswitch, located in the flight deck 12, which also has respective "downlocked" and "unlocked" positions. Each hydraulic system is self contained and is controlled from the flight deck, for example, by means of a flexible cable 50.

Alternatively, the operation of each individual hydraulic system may be automated, for example, by introducing a pressure sensor 35 in each downlock unit 29 which may sense the presence of a wheel when a CA touches down the respective downlock unit 29, with its landing gear. Upon actuation, each sensor 35 energizes the solenoid of the selector valve of the respective hydraulic system, thereby, directing hydraulic pressure toward the rear or front ends of the cylinder 34, in order to lockdown or to unlock the respective landing gear wheel of the CA. In a manual downlock operation, the sensor 35 may be employed, for example, to indicate the CA's landing gear adequate positioning and a readiness for downlock operation.

The front and rear downlock spars 43 and 42 comprise adjacent front and rear grid members 95 and 96, respectively, as illustrated in FIG. 7, so as to create during motion an interference with each other, and also interference with stationary grid members affixed to respective portions of the platform 4. Such interference will create a relatively smooth surface of the top of the platform 4. Similar left and right grid members 104 and 105, respectively, are shown in FIG. 4, to provide improved travel conditions for the CA's landing gear.

The runway platform 4, also, contains an arrester arrow 55, (or alternatively, an arrester wire 92) which is, preferably, mounted on an arrester spar 58, as shown in FIG. 7. The arrester spar 58, together with the arrow 55, or the arrester wire 92, are located at the rear end of the platform 4 and may move along the FRA's axis X—X, for example, by means of left and right endless chain driving mechanisms 97a and 97b, respectively, securing a variable location of the arrester means along the longitudinal axis X—X of the FMPAC. Alternatively, the arrester arrow 55 may have a variable height, by means of employing similar repositioning means, so as to provide an adjustment of its position along the vertical axis Z—Z of the composite aircraft. Each CA, taking off or landing on the surface of the FMPAC, preferably, comprises an arrester hook 27 of a conventional type, substantially similar to the arrester arrow of a naval aircraft, which is attached to its rear fuselage end, as shown in FIGS. 8 and 9. Furthermore, the arrester arrow 55 may contain an energy absorbing means at its middle portion. The energy absorbing means is, for example, a shock absorber 60 which may compress by the arrow hook 27 along the axis X—X, during landing of a Ca, after the arrow hook 27 has been centered at the end of sliding along the edges of the arrester arrow 55 or the arrester wire 92.

As shown in FIG. 9, the FMPAC may lower its rear end, so as to allow a CA or other types of cargo to be transported to the top surface of the platform 4. Such a tilting is provided, for example, by the front landing gear 18a and 18b, which rises the front portion of the FMPAC, and by a rear landing gear 98a and 98b which lowers the rear portion of the FMPAC, as symbollicaly illustrated in FIG. 9 by a sloped ground line c—c. Further, the CA may be positioned on the surface of the platform 4 by a ramp and a winch for rolling the CA on and off the platform 4.

All downlock units, preferably, have navigation markers, as seen in FIGS. 8 and 9. Navigation markers are, for example, light sources 52, located at the top portion of each guiding plate 40 or 41. Board navigation light sources 57 are also placed at the top portion of each vertical stabilizer 13 and at the outlines of the runway platform 4, therefore, providing better visibility for the landing CA. Alternatively, a front TV monitor 53 is located at the front end of the platform 4, along the axis of symmetry X—X, in combination with a rear TV monitor 54 (shown only in FIG. 9) and located along the axis X—X, under the arrester arrow 55. The two TV monitors 53 and 54 may provide further feedback in guiding a landing CA, by means of TV display terminals, located at the flight deck 12 and, optionally, at the CA's cockpit. The front monitor 53 is located away from the front unit 29c or, alternatively, it may be mounted on a retractable mechanism, not shown, so as to provide a better space for the CA's front landing gear, during take-off. An on-board instrument landing system (not shown) may also be employed, to provide an automated landing of the CA on the surface of the runway platform during night, or during adverse weather conditions.

Alternatives of the various components and features of the FMPAC are shown in FIGS. 10-27. FIGS. 10 and 11 illustrate a modification of the FMPAC shown in FIGS. 2 and 3. It indicates a design version, wherein two fuselages 101a and 101b are mounted adjacent to the lower portion of the platform 4. The platform 4 also contains two vertical stabilizers 102a and 102b, which are attached to the lower portion of the horizontal stabilizers 14a and 14b. In such a combination, the FMPAC allows landing and take off of a CA with an increased wing span which may be larger than the distance between the fuselages 101a and 101b.

The FMPAC may have a variety of applications. FIG. 12 shows, for example, a launcher of a remote-piloted vehicle or the like, mounted on a wheeled carriage 106 whose wheels may be locked down by the lock down units 29 of the platform 4. Another example would be the carriage of a land transportation vehicle, wherein its wheels are locked down by the downlock units 29, after respective repositioning and, perhaps, placing a forth downlock module unit, for example, 29d placed on the front spar 43.

Figure 13:
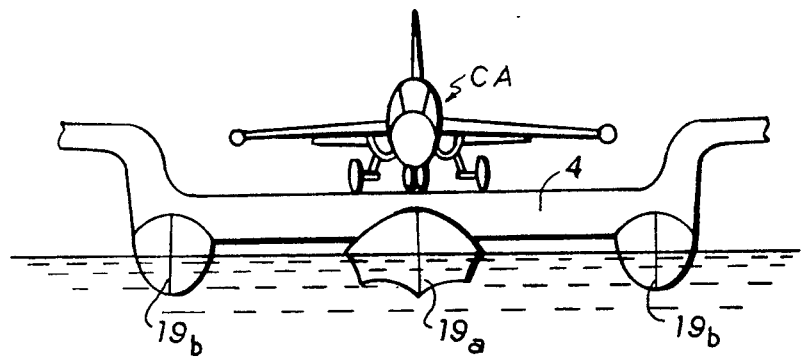
FIG. 13 is a front view of the FMPAC comprising an alternative flying boat undercarriage.
Figure 14:
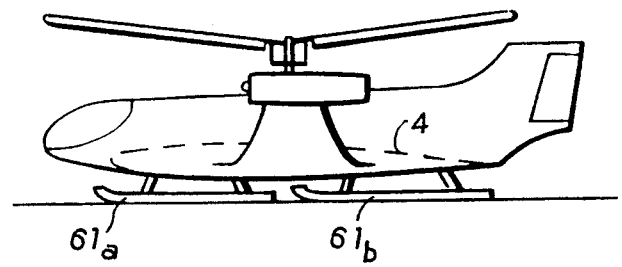
FIG. 14 is a side view of the FMPAC comprising a ski type of undercarriage.

A flying boat undercarriage 19 is provided, as shown in FIG. 13, to allow V/STOL of the composite aircraft from water surface. In a preferred design arrangement, it consists of a central flying boat 19a, and of two side flying boats 19b, attached to the bottom portion of the runway platform 4. Also, another undercarriage of a ski type 61, comprising two front members 61a and two rear members 61b, may be employed, as shown in FIG. 14, instead of the landing gear 18, 98, or the flying boat undercarriage 19.

Figure 15:
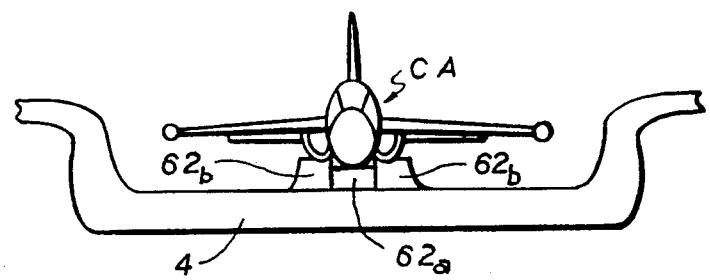
FIG. 15 is a front view of the FMPAC comprising means to accomodate a CA, which is without landing gear means.

V/STOL assisted CA may, alternatively, use for support a central stationary undercarriage 62a and, for example, two side undercarriage members 62a, instead of its landing gear 24 and 25, as shwn in FIG. 15. The stationary under carriage 62 is located on the top surface of the runway platform 4, and may be used in emergency case, when, for example, the landing gear of a CA is locked in its retracted position. Further, a CA, not comprising landing gear 24 and 25 and/or take-off/landing wing mechanization, may have increased maximal payload, if it is provided to operate on a regular basis with a FMPAC having such undercarriage 62.

Figure 17:
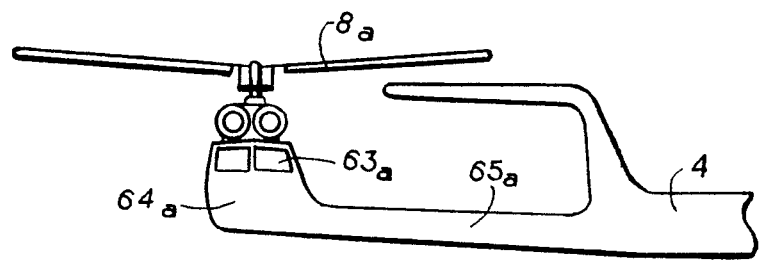
FIG. 17 is a front view of the FMPAC, wherein, its fusilage and flight deck are located under the rotary wing lift means.

In a modified version, as shown in FIG. 17, a flight deck 63a may be located in a fuselage 64a which is attached to the runway platform 4 by a horizontal support structure 65a. In such a case, the rotary wing 8a is located on the top of the fuselage 64a. Due to a full symmetry, the fuselage 64b comprising the rotary wing 8b which is in side-by-side configuration with the rotary wing 8a, is not shown in FIG. 17.

Figure 16:
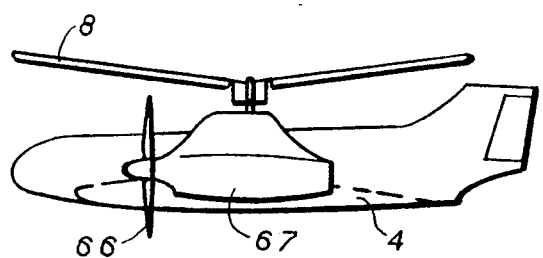
FIG. 16 is a side view of the FMPAC comprising propelling means to provide optional horizontal thrust.

The lift means 8, as shown in FIGS. 1, 2, and 3 or the alternative lift means as shown in FIGS. 18, 19, 20 and 21, produce a horizontal thrust which, in some cases, may be not enough to provide the required horizontal speed of the flying FMPAC or composite aircraft. In such a case, the required horizontal thrust may be generated by additional thrust producing means such as a turboprop engine 67, having a propeller 66, as shown in FIG. 16. Alternatively, the required forward speed of the composite aircraft may be attained by providing additional thrust, from the engines of the CA.

Figure 18:
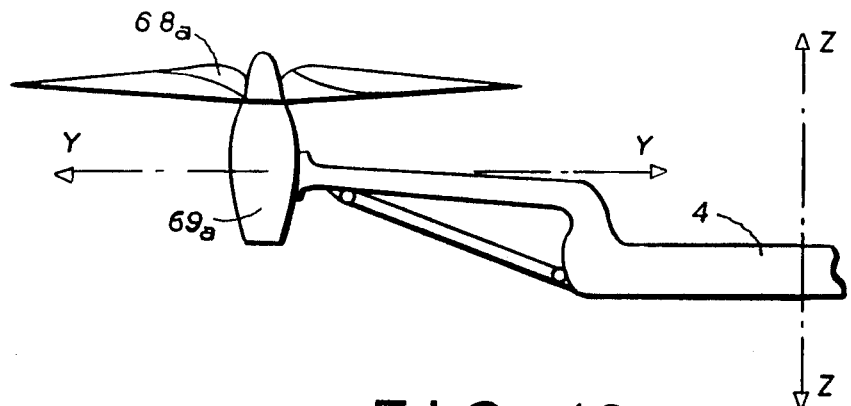
FIGS. 18-21 illustrate alternative types of lift means of the FMPAC.

FIGS. 18, 19, 20 and 21 show various types of lift means, which may be used in side-by-side configuration to provide V/STOL operation of the FMPAC or the composite aircraft, in place of the described above helicopter rotary wing lift means 8. FIG. 18 shows, for example, a pair of tilted rotor lift means comprising a propeller 68a which is in side-by-side configuration with a propeler 68b, and respective shaft turbine engines 69a and 69b. The engines 69 may rotate together with the propellers 68 about a horizontal axis parallel to the lateral axis Y—Y of the FMPAC, to provide a foward thrust when tilted.

Figure 19:
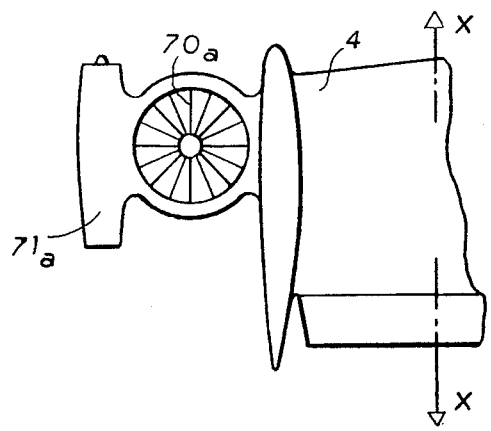

Another type of lift means is shown in FIG. 19. It consists of a tip lift fan arrangement 70a propelled by a gas turbine engine 71a which is in side-by-side configuration with respective lift means 70b and 71b, attached to the opposite side of the runway platform 4. The lift means 70b and 71b are not shown in FIG. 19, due to the symmetry of the FMPAC about its axis X—X.

Figure 20:
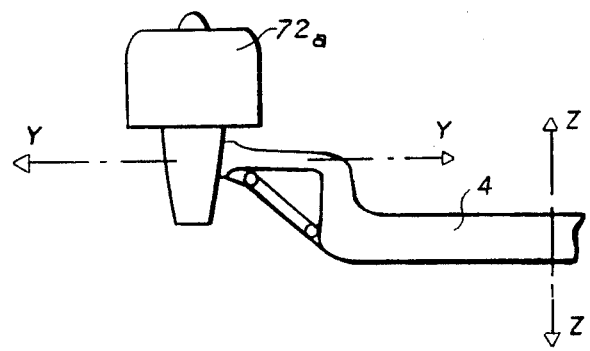

Still another type of alternative lift means is shown in FIG. 20. It includes a number of turbofan engines 72a, which operates in side-by-side configuration with a number of turbofan engines 72b, not shown in FIG. 20, due to its symmetrical position about the vertical axes X—X and Z—Z of the FMPAC. The turbofan engines 72a and 72b are mounted to the FMPAC, to preferably, rotate about axes parallel to the axis Y—Y, in order to produce vertical and horizontal thrust when tilted.

Figure 21:
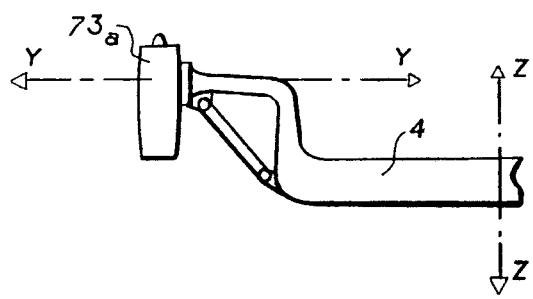

Further, a number of more conventional type of gas turbine engines 73 with a low bypass ratio, are shown in FIG. 21. A number of left engines 73a and a number of right engines 73b (engines 73b are not shown in FIG. 21) are mounted in side-by-side configuration to the runway platform 4, and can be used as lift means and horizontal thrusters, due to the preferable rotation about axes parallel to the lateral axis Y—Y.

Figure 22:
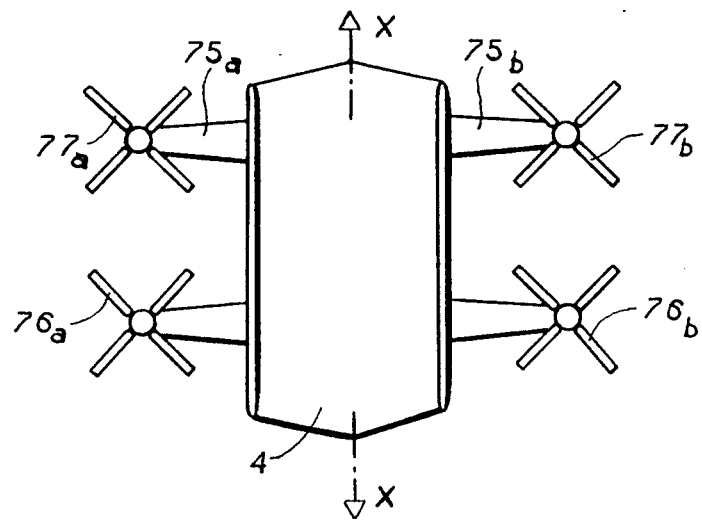
FIGS. 22 and 23 show an arrangement of multiple means to lift the body of the FMPAC.
Figure 23:
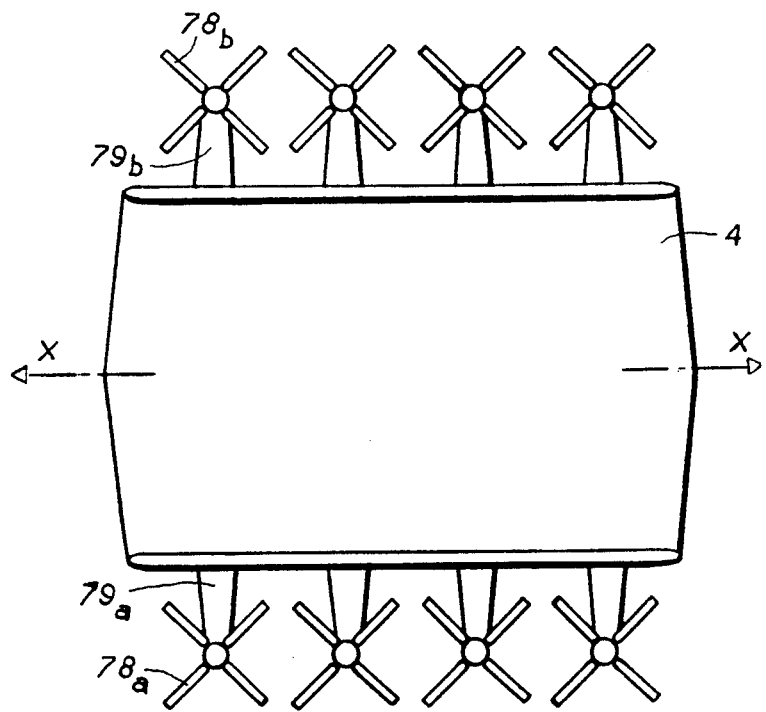

More than two lift means may be used in side-by-side configuration to provide a FMPAC capable of lifting CA with increased maximal weight. FIG. 22 shows a modified version of the FMPAC comprising two pairs of lift means 76a and 76b and 77a and 77b, located in side-by-side configuration, by means of side frames 75a and 75b. The lift means are, preferably, of a helicopter rotor blade type, such as the rotary wings 8a and 8b, and are powered by respective shaft turbine engines. The number of the lift means may be further increased to more than two pairs of lift means. For exaple, it may be four, six or eight pairs of lift means in order to provide the FMPAC with a capability of lifting CA with further increased weight. Such multi-rotor lift means arranged in side-by-side configuration are illustrated in FIG. 23, wherein four pairs or eight lift means 78 disposed symmetrically about the FRA's axis X—X, are affixed to respective side frames 79, to provide the aircraft with large payload capability.

Figure 24:
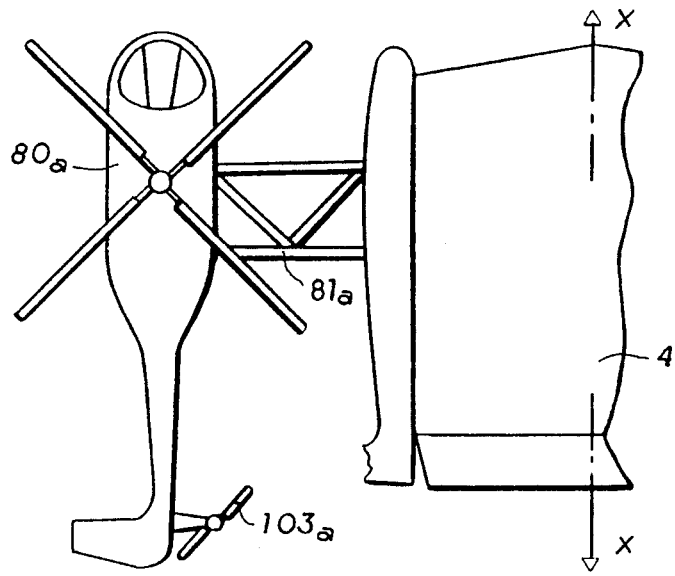
FIGS. 24 and 25 illustrate a conventional helicopte used as lift means of the FMPAC.
Figure 25:
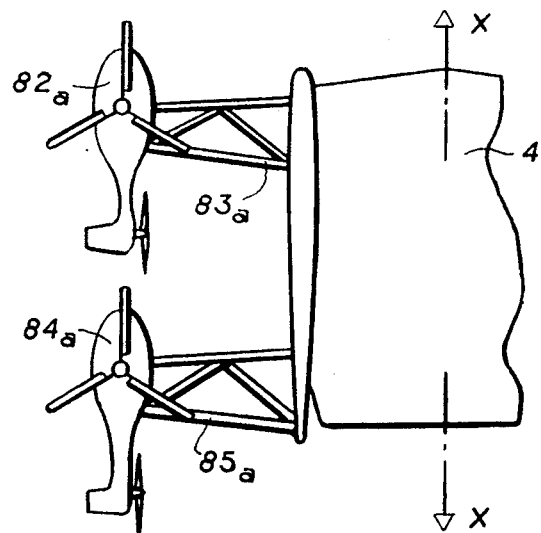

In a further alternative arrangement, the runway body of the FMPAC may be lifted by two conventional helicopters 80a and 80b, as shown in FIG. 24. The conventional helicopters are attached to both lateral ends of the runway platform 4 in side-by-side configuration by means of side frames 81a and 81b. Only the left side of the FMPAC is shown in FIG. 24, due to the substantial symmetry of the FMPAC. The tail propellers 103a and 103b of each helicopter may be provided to operate in a horizontal plain similarly to the auxilliary propellers 16, shown in FIGS. 1 and 2, in order to increase the allowed e.g. location along the axis X—X of the FMPAC. Alternatively, more than two conventional helicopters may be used as lift means of the FMPAC. FIG. 25 shows, for example, two lift pairs of conventional helicopters. The front pair of conventional helicopters 82a and 82b is attached to the runway body of the FMPAC by side frames 83a and 83b. Similarly, rear conventional helicopters 84a and 84b are attached to the runway platform 4 of the FMPAC in side-by-side configuration by means of side frames 85a and 85b. The identical helicopters 82b and 84b and also, the respective side frames 83b and 85b are not shown in FIG. 25, due to the symmetry of the FMPAC about its longitudinal axis X—X.

Figure 26:
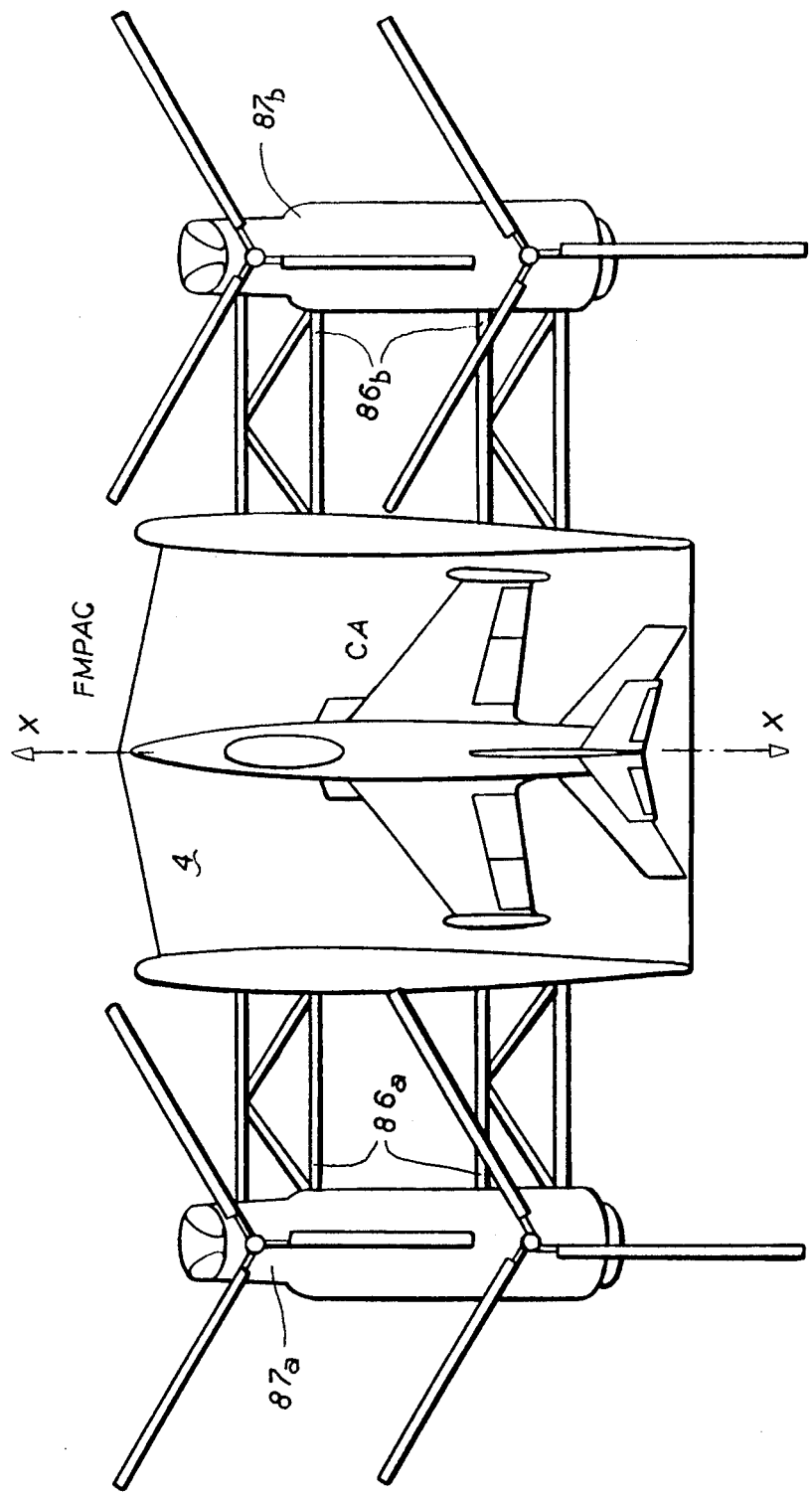
FIGS. 26 and 27 show a conventional two rotor tandem helicopter means used as lift means of the FMPAC.

A two-rotor tandem conventional helicopter may also be used in side-by-side configuration, as shown in FIG. 26. A tandem substantially conventional helicopter 87a is attached to the runway platform 4 of the FMPAC, for example, by two side frames 86a. The right side of the FMPAC comprises another tandem substantially conventional helicopter 87b, which is attached to the runway platform 4 by two respective side frames 86b.

Figure 27:
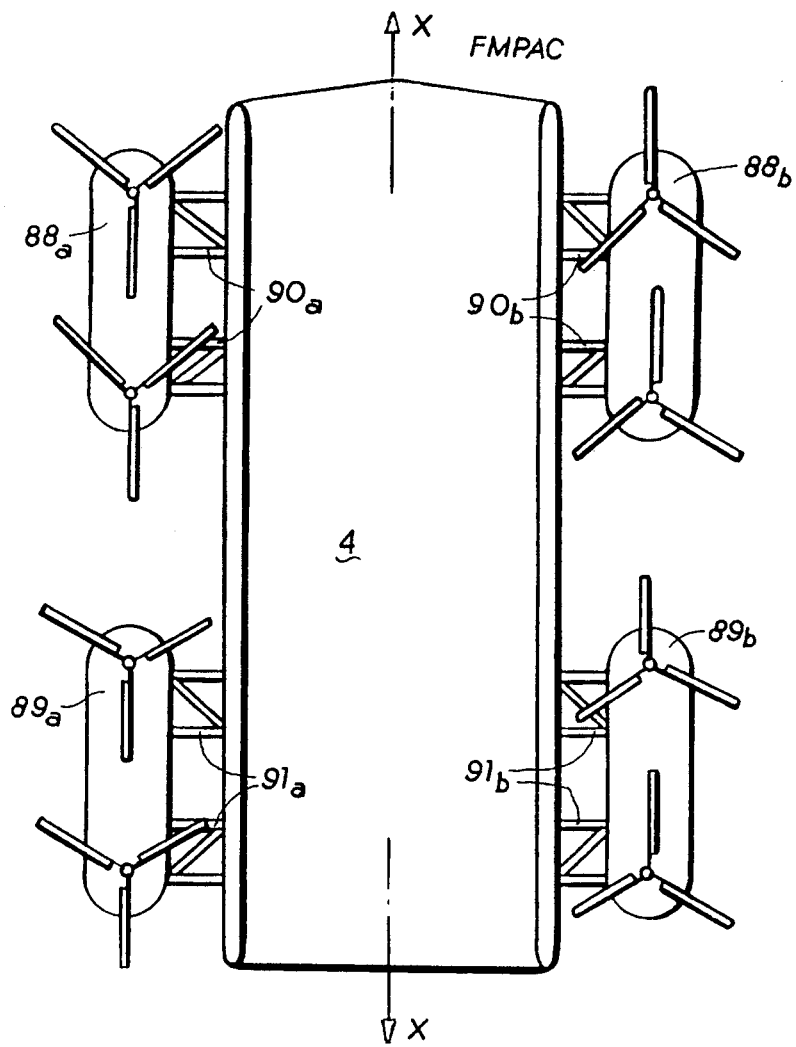

FIG. 27 shows a variation of the tandem helicopter lift arrangement, shown in FIG. 26, wherein more than one pair of tandem helicopters are used in side-by-side configuration. There is, for example, a front pair of tandem helicopters 88a and 88b, attached to the runway platform 4 by two front side frames 90a and 90b. The FMPAC, also, comprises a rear pair of conventional tandem helicopters 89a and 89b, attached to the platform 4 by two rear side frames 91a and 91b.

OPERATION

(a) Take-off

In operation, before take-off of the composite aircraft, the fixed wing Ca is positioned on the top of the FRA's runway platform 4 with its engines, preferably, running; with the front and rear landing gear 24 and 25 locked down to the surface of the platform 4 by the downlock units 29; and with its landing gear brakes, preferably, actuated. The position of the c.g. of the composite aircraft may be corrected when necessary, for example, if the FMPAC does not comprise the optional pitch balancing auxilliary rotors 16 and the position of the c.g. is out of its allowable limits. The correction may be provided by a simultaneous shift of the downlock units 29, thus shifting the entire CA along the aircraft's axis X—X. Take-off of the composite aircraft may be performed from any relatively flat ground surface in a way substantially similar to the V/STOL of a conventional helicopter, as shown in FIG. 1. After take-off of the composite aircraft, before separation or take-off of the CA from the surface of the FMPAC, the composite aircraft, which is operated, preferably, from the flight deck 12, heads against the wind, with a forward speed slightly higher than the stall speed of the CA. The engines of the CA are accellerated to take-off rpm, and simultaneously, the pilot of the FMPAC turns on the two-positioned downlock switch on "unlocked" position, in order to unlock the module downlock units 29 and, thus to unlock the landing gear of the Ca. That allows the pilot of the CA to take-off from the surface of the FMPAC with an increased engines thrust in a way substantially similar to the take-off of a fixed wing aircraft from a conventional runway.

(b) On board landing

Landing of the CA on the surface of the FMPAC is performed in reverse, as shown in FIGS. 8 and 9. The gearhead motors 47a and 47b and the endless chanin drive motors 94, 93 and 97 are actuated, for example, by the pilot of the FMPAC, prior to landing of CA, so as to adequately position the module downlock units 29 and the arrester arrow 55, (or the arrester wire 92), along the FRA's axes X—X and Y—Y, in case other type of CA, comprising different landing gear geometry and arrester hook location, is approaching for landing. Also, all downlock plates 31 and 32 from the respective downlock mechanisms 9a and 9b are positioned in their unlocked positions 31b and 32b.

All navigation lights 52 and 57, and all other navigation means, including the optional front TV monitor 53 and the TV monitor 54, and, also, the optional on-board instrument landing system (to automate the on-board landing) are on, thus allowing for a better flight navigation and communication between the two aircrafts, in addition to the existing radio communication means, during the entire V/STOL operation.

The two aircraft are flying against the wind, prior to landing of the CA. The pilot of the CA has to see the FMPAC and its navigation on board instruments in a substantially full symmetry, as shown in FIG. 8, after he has corrected the position of his aircraft prior to landing. After that, he orients the CA in a conventional way, for example, with nose up, during approaching the FMPAC for landing, with a forward speed slightly higher than the stall speed of his CA. Such a speed level should be also attained by the FMPAC, whose maximal speed must be slightly above the stall speed of the landing CA. The pilot of the CA may approach the FMPAC with a substantially low relative speed, for example, with a landing speed of one to three m.p.h., in order to have enough time to adequately position its CA, before touchdown. The first part of landing, performed as slow as necessary, is completed when the arrester hook 27 of the CA touches the middle portion of the arrester arrow 55 or the optional arrester wire 92, as shown in FIG. 7.

The downwash from the CA during landing may provide an aerodynamic pitch momentum about the logitudinal axis Y—Y. In such a case, the autostabilizing system will adequately affect the angular position of the horizontal stabilizers 14, the flap 6, the canary wings 15 or the thrust of the auxilliary rotors 16 in an adequate combination. Such a correction may be also provided manually, by the pilot of the FMPAC, when appropriate.

The second part of landing begins when the arrester hook 27 of the CA reaches the middle position of the arrester arrow 55, (after possible sliding along the edges of the arrow, due to a pilot landing error) and actuates the shock absorber means 60. After that moment, which is, preferably, indicated by an arrester sensor, the pilot of the CA maintains physical contact with the FMPAC, either by slightly increasing the CA's engines thrust, or by locking the arrester hook 27 to the arrester arrow 55 by an arrester lock (the arrester sensor and the optional arrester lock are not shown in the drawings); and concurrently, therewith, performs the downward motion, as indicated by arcs 26a and 26b in FIG. 9.

In a first touchdown mode, the downward motion is guided by the prepositioned rear guiding plates 40a and 40b and front guiding plates 41a and 41b, as shown in FIGS. 8 and 9. The downward motion of the CA may be performed easier if the optional front TV monitor 53 is used as a feedback.

In a preferred second touchdown mode, the span between the guiding plates 40a and 40b, and 41a and 41b, or between the pushers 40aa and 40bb and 41aa and 41bb (used instead of the guiding plates 40a and 40b in case a portion of the guiding plates 40 and 41 interferes with a hardware from the CA, surrounding its landing gear 24 and 25) may be left much larger than the respective landing gear span, allowing for a large margin of error, and a freer touchdown, respectively, not requiring the TV monitor 53 or other type of feedback. After touchdown, however, the plates 40a, 40b and 41a, 41b or the pushers 40aa, 40bb and 41aa, 41bb move inwardly toward the axis X—X, by the respective lead-screw driving mechanisms, which are actuated by the respective lead screws 45a and 45b, until they flank the respective portion of each wheel, as shown in FIGS. 6 and 7, in order to fully correct (by pushing a respective landing gear) the position of the CA, whose weight and respective friction with the surface of the platform 4 at that moment of flight, is substantially close to zero. Slip clutches 59a and 59b prevent the lead-screw mechanisms overload, after the longitudinal axis X'—X' of the CA has been corrected to substantially coincide with the vertical plane of symmetry X-Z of the FMPAC.

The first and the second modes of touchdown may be executed by the pilot of the CA as slow as necessary, due to the zero relative speed of his CA. The CA is fully secured to the surface of the FMPAC, after lockdown of the CA's landing gear wheels, by the respective downlock plate-bar mechanisms 9a and 9b, as shown in FIGS. 5 and 6, and in addition, after actuation of its landing gear brakes. An aerodynamic pitch momentum, balancing the composite aircraft about its lateral axis Y—Y, may be provided by operation of the horizontal stabilizers 14, the flap 6, or the canary wings 15, immediately after touchdown of the CA. Any unacceptable position of the c.g. of the composite aircraft, flying at low forward speed, during hovering, or during a vertical flight of the composite aircraft, may be compensated manually or by the autostabilizing system which operates the thrust producing rear auxilliary rotors 16, or the rear main rotors, if employed instead of the auxilliary rotors 16. Otherwise, if possible, all downlock units 29 should be shifted simultaneously along the FRA's axis X—X, in order to move the c.g. of the composite aircraft within its allowable limits, so as to secure a normal flight of the composite aircraft, without the correcting action of the rear auxilliary propellers 16.

The pilot of the FMPAC is ready, thereafter, to head the composite aircraft toward its base, by flying and maneuvering the aircraft as a helicopter comprising rotors in a side-by-side configuration, and to land, for example, in a V/STOL mode. Such a V/STOL mode may be also performed to and from a water surface, if the FMPAC is equipped with the flying boat undercarriage 19a and 19b, as illustrated in FIGS. 3 and 13.

The foregoing embodiment and its alternatives illustrate various principles of the invention, but it should be clear that numerous modifications and changes will readily occur to those skilled in the art based on the disclosure of this application, and that the invention is not limited to the exact construction and operation disclosed in detail but encompasses suitable modifications and equivalents utilizing the invented principles and falling within the scope of the invention. It should be appreciated that the exemplary embodiment and its alternatives discussed in detail above share inventive principles disclosed herein, and that certain details disclosed with respect to one version are applicable to another, and that certain conventional details known in the arts of fixed wing aircraft and helicopters have been omitted for the sake of making this disclosure more concise and more easily understandable to persons of ordinary skill in such arts. As a specific and nonlimiting example, the tilted rotor arrangement and the other disclosed alternative lift means may be used in a FMPAC. Also, the disclosed runway body, the downlock units, the arresting arrangement, and the various navigation means may be used in a FMPAC comprising more than one pair of lift means disposed in side-by-side configuration, without departing from the principle of the present invention.

What is claimed is:

1. A multi-purpose V/STOL composite aircraft comprising:

runway platform means of sufficient size comprising substantially flat top surface and having left and right outboard edges to define a runway therebetween, thus enabling the pilot of a conventional aircraft to take off or to land to the platform means in a manner substantially similar to the landing to and take off from a conventional runway;

at least one variable position front downlock mechanism means and at least one variable position rear downlock mechanism means to accomodate to the geometry and to detachably lock down to the platform means the front and the rear landing gear wheels, respectively, of a conventional aircraft, after being positioned on the top surface of said platform means with a large margin of error;

flight deck means located preferably near at least one outboard edge of said platform means;

at least one left rotary wing lift means rotating in a substantially horizontal plane of rotation, having a substantially large diameter helicopter type rotary blades, and comprising means to control the cyclic and collective pitches of the blades of said left rotary wing lift means during a vertical and forward flights and also during turns as well as during a regime of autorotation of said composite aircraft; said left rotary wing lift means being located near the left outboard edge and substantially outside the left edge of said platform means;

at least one right rotary wing lift means rotating in a substantially horizontal plane of rotation, having a substantially large diameter helicopter type rotary blades, and comprising means to control the cyclic and collective pitches of the blades of said right rotary wing lift means during a vertical and forward flights and also during turns as well as during a regime of autorotation of said composite aircraft; said right rotary wing lift means being located near the right outboard edge and substantially outside the right edge of said platform means, wherein said left and right rotary wing lift means are attached to said platform means preferably in side-by-side configuration to provide a vertical and forward flight thrust generation for vertical and forward flights and also a differential thrust generation during maneuvering;

connecting means, extending sideway, from said platform means, to permanently connect the platform means to the respective left and right rotary wing lift means so as to provide reduced interference of the induced downwash from the left and right rotary wing lift means to said side supporting means and said platform means;

whereby said composite aircraft may take off or land in a substantially V/STOL mode, carrying on its board various payloads or a conventional aircraft, as the pilot of said conventional aircraft may take off or land on the surface of said platform means with a large margin of error, and in a manner substantially similar to the landing and take off from a conventional runway.

2. The composite aircraft as described in claim 1, wherein said platform means have a substantially wide and long wing-like outline and substantially an airfoil crossection to provide a reduced drag during a forward flight of said composite aircraft.

3. The composite aircraft as described in claim 1, wherein said front downlock mechanism means comprises:
   front carrier means located in the front portion of said platform means and extending along the lateral axis Y—Y of the composite aircraft to carry said front downlock mechanism means;
   means to reposition the front downlock mechanism means substantially along the front carrier means, and thus substantially along the Y—Y axis of the composite aircraft;
   means to reposition the front carrier means substantially along the longitudinal axis X—X of the composite aircraft.

4. The composite aircraft as described in claim 1, wherein said rear downlock mechanism means comprises:
   rear carrier means located after the front downlock mechanism means and extending along the lateral axis Y—Y of the composite aircraft, to carry said rear downlock mechanism means;
   means to reposition the rear downlock mechanism means substantially along the rear carrier means, thus along the Y—Y axis of the composite aircraft;
   means to reposition said rear carrier means substantially along the longitudinal axis X—X of the composite aircraft.

5. The composite aircraft as described in claim 1, wherein each of said front and rear downlock mechanism means includes:
   a front plate-bar mechanism means and a rear plate-bar mechanism means, each comprising a downlock plate means, wherein the downlock plate means of the front plate-bar mechanism means in combination with the downlock plate of the rear plate-bar mechanism means press substantially downward the respective front and rear upper wheel portions of a wheel, so as to lock it down to said platform means;
   actuator means to actuate said mechanism means in its downlocked and unlocked positions;
   means to power said actuator means providing the downlocked and unlocked positions of said downlock mechanism means.

6. The composite aircraft as described in claim 1, further comprising wheel guiding means, located near each of said downlock mechanism means to guide, during the last phase of landing, the vertical, the horizontal and the lateral motion of a respective wheel from the landing gear of a conventional aircraft, so as to provide a proper positioning of a landing gear wheel substantially near a respective downlock mechanism means, before downlock operation.

7. The composite aircraft as described in claim 1, further comprising respective wheel pusher means, each having a guiding and a pushing portions, said pusher means being located near each of said downlock mechanism means to provide a horizontal guide, during the last phase of landing, and a lateral push during or after such a horizontal guide, of a respective wheel from the landing gear of a conventional aircraft, so as to provide a proper positioning of the respective wheel substantially near a respective downlock mechanism means before downlock operation.

8. The composite aircraft as described in claim 1, wherein said means to control the cyclic and collective pitches of the blades of said left and right rotary wing lift means is a swash plate apparatus.

9. The composite aircraft as described in claim 1, further comprising means to arrest a landing conventional aircraft before lock down to said platform means.

10. The composite aircraft as described in claim 9, wherein said arrester means comprise variable position arrester carrier means to position the arrester means substantially along the longitudinal axis X—X and the vertical axis Z—Z of the composite aircraft.

11. The composite aircraft as described in claim 9, wherein said means to arrest the conventional aircraft during landing on its surface is an arrester arrow-shaped means.

12. The composite aircraft as described in claim 9, wherein said means to arrest the conventional aircraft during landing on its surface is an arrow-shaped wire arrester means.

13. The composite aircraft as described in claim 1, further comprising at least one auxilliary propeller means, preferably located near the rear portion of said platform means and preferably rotating in a horizontal plain, so as to provide a pitch control momentum of said composite aircraft.

14. The composite aircraft as described in claim 13, wherein said auxilliary propeller means are a pair of left and right rotary wing lift means, substantially similar to said left and right rotary wing lift means, as the left and right rear rotary wing lift means are located near the rear portion of said platform means in a side-by-side configuration and rotate in a substantially horizontal plane, thereby providing a substantial lift.

15. The composite aircraft as described in claim 1, wherein said left and right rotary wing lift means are powered by shaft turbine engines.

16. The composite aircraft as described in claim 1, comprising a detachable payload means to be detachably locked down to said front downlock mechanism means and said rear downlock mechanism means.

17. The composite aircraft as described in claim 16, wherein said detachable payload means comprise a body carriage having rotatable wheels mounted thereunder, for enabling said body carriage to roll along the platform means of said multi-purpose composite aircraft and to detachably lock down to said platform means, thereafter, by using said front and rear downlock mechanism means.

18. The composite aircraft as described in claim 1, wherein said rotary wing lift means are at least two substantially conventional helicopters disposed in side-by-side configuration and connected to said platform means by means of said side supporting means.

19. The composite aircraft as described in claim 18, wherein said substantially conventional helicopters are at least two tandem helicopters, to define at least one pair of helicopter lift means, disposed in side-by-side configuration to said platform means.

20. A method of operating a composite aircraft for V/STOL comprising:
   providing runway platform means of sufficient size comprising substantially flat top surface and having left and right outboard edges to define a runway therebetween, thus enabling the pilot of a conventional aircraft to take off or to land to the platform means in a manner substantially similar to the landing to and take off from a conventional runway;
   providing at least one variable position front downlock mechanism means and at least one variable position rear downlock mechanism means to accomodate to the geometry and to detachably lock down to the platform means the front and the rear landing gear wheels, respectively, of a conventional aircraft, after being positioned on the top surface of said platform means with a large margin of error;

providing flight deck means located preferably near at least one outboard edge of said platform means;

providing at least one left rotary wing lift means rotating in a substantially horizontal plane of rotation, having a substantially large diameter helicopter type rotary blades, and comprising means to control the cyclic and collective pitches of the blades of said left rotary wing lift means during a vertical and forward flights and also during turns as well as during a regime of autorotation of said composite aircraft; said left rotary wing lift means being located near the left outboard edge and substantially outside the left edge of said platform means;

providing at least one right rotary wing lift means rotating in a substantially horizontal plane of rotation, having a substantially large diameter helicopter type rotary blades, and comprising means to control the cyclic and collective pitches of the blades of said right rotary wing lift means during a vertical and forward flights and also during turns as well as during a regime of autorotation of said composite aircraft; said right rotary wing lift means being located near the right outboard edge and substantially outside the right edge of said platform means, wherein said left and right rotary wing lift means are attached to said platform means preferably in side-by-side configuration to provide a vertical and forward flight thrust generation for vertical and forward flights and also a differential thrust generation during maneuvering;

providing connecting means, extending sideway, from said platform means, to permanently connect the platform means to the respective left and right rotary wing lift means so as to provide reduced interference of the induced downwash from the left and right rotary wing lift means to said side supporting means and said platform means;

attaching the fixed wing conventional aircraft by means of said downlock mechanism means to the platform means to form a composite aircraft;

raising said composite aircraft, in a preferably V/STOL mode, by means of said at least one left and at least one right rotary lift means;

accelerating said composite aircraft to a speed above the stall speed of said fixed wing aircraft;

releasing said fixed wing conventional aircraft from said platform means by unlocking said downlock mechanism means during forward flight of said composite aircraft for independent flight of the conventional aircraft;

approaching the platform means by a conventional aircraft;

arresting the conventional aircraft when nearly aligned with said platform means by means of arresting arrow-shaped means;

guiding the proper positioning of the landing gear of the conventional aircraft by wheel guiding means, so as to locate its wheels near respective downlock mechanism means during a first phase of landing;

locking down the conventional aircraft to said platform means by means of said front and rear downlock mechanism means, after touchdown, to form composite aircraft;

stabilizing said composite aircraft to secure normal forward and vertical flight by means of flight stabilizing and control means;

landing said composite aircraft preferably in a V/STOL mode by means of said at least one left and at least one right rotary wing lift means.

* * * * *